(12) United States Patent
Chen

(10) Patent No.: US 9,436,531 B1
(45) Date of Patent: *Sep. 6, 2016

(54) MONITORING APPLICATION LOADING

(71) Applicant: Google Inc., Mountain View, CA (US)

(72) Inventor: Si Chen, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/978,121

(22) Filed: Dec. 22, 2015

Related U.S. Application Data

(63) Continuation of application No. 14/807,772, filed on Jul. 23, 2015.

(51) Int. Cl.
| | |
|---|---|
| *G06F 3/00* | (2006.01) |
| *G06F 9/44* | (2006.01) |
| *G06F 9/54* | (2006.01) |
| *G06F 11/30* | (2006.01) |
| *G06F 11/34* | (2006.01) |

(52) U.S. Cl.
CPC ............... *G06F 9/542* (2013.01); *G06F 9/54* (2013.01); *G06F 11/302* (2013.01); *G06F 11/3495* (2013.01)

(58) Field of Classification Search
CPC .......................... G06F 9/54; G06F 2212/2022
USPC .......................................... 719/310; 711/101
See application file for complete search history.

(56) References Cited

U.S. PATENT DOCUMENTS

| | | | |
|---|---|---|---|
| 6,253,317 B1 * | 6/2001 | Knapp, III | ............ G06F 9/4425 710/260 |
| 7,617,225 B2 | 11/2009 | Arrouye | |
| 8,086,957 B2 | 12/2011 | Bauchot | |
| 8,458,384 B2 | 6/2013 | Johnson | |
| 8,510,764 B1 | 8/2013 | Deselaers | |
| 8,515,979 B2 | 8/2013 | Mehta | |
| 8,554,345 B2 | 10/2013 | Fernandez | |

(Continued)

FOREIGN PATENT DOCUMENTS

| | | |
|---|---|---|
| EP | 2474905 | 7/2012 |
| EP | 2495670 | 9/2012 |

OTHER PUBLICATIONS

David Atienza, Systematic Dynamic Memory Management Design Methodology for Reduced Memory Footprint, 2006.*

(Continued)

*Primary Examiner* — Lechi Truong
(74) *Attorney, Agent, or Firm* — Fish & Richardson P.C.

(57) ABSTRACT

Methods, systems, and apparatus, for determining when an application is sufficiently instantiated to be subject to a crawling operation. In an aspect, a method includes instantiating a native application instance that generates environment instances for display on a user device within the native application instance; in response to the instantiation of the native application instance: monitoring for occurrences of activity lifecycle events of the native application instance, monitoring for changes in a memory footprint of the native application instance, and generating, in response to the monitoring of the lifecycle events and monitoring of the changes in the memory footprint indicating the native application instance is sufficiently instantiated to be subject to a crawling operation, a load signal indicating the native application instance is sufficiently instantiated to be subject to the crawling operation.

20 Claims, 5 Drawing Sheets

(56) References Cited

U.S. PATENT DOCUMENTS

| | | |
|---|---|---|
| 8,595,450 B2 | 11/2013 | Nguyen |
| 2004/0030882 A1 | 2/2004 | Forman |
| 2005/0044191 A1 | 2/2005 | Kamada |
| 2007/0209080 A1 | 9/2007 | Ture |
| 2010/0257466 A1 | 10/2010 | Wroblewski |
| 2010/0306191 A1 | 12/2010 | LeBeau |
| 2011/0029820 A1* | 2/2011 | Sehr .................. G06F 21/53 714/38.1 |
| 2011/0252038 A1 | 10/2011 | Schmidt |
| 2011/0314004 A1 | 12/2011 | Mehta |
| 2012/0124061 A1 | 5/2012 | Macbeth |
| 2012/0179706 A1 | 7/2012 | Hobbs |
| 2012/0179955 A1 | 7/2012 | French |
| 2012/0290584 A1 | 11/2012 | De |
| 2012/0316955 A1 | 12/2012 | Panguluri |
| 2012/0323898 A1 | 12/2012 | Kumar |
| 2013/0006897 A1 | 1/2013 | Jain |
| 2013/0110815 A1 | 5/2013 | Tankovich |
| 2013/0111328 A1 | 5/2013 | Khanna |
| 2013/0122861 A1 | 5/2013 | Kim |
| 2013/0124606 A1 | 5/2013 | Carpenter |
| 2013/0191360 A1 | 7/2013 | Burkard |
| 2013/0232256 A1 | 9/2013 | Lee |
| 2013/0298007 A1 | 11/2013 | Cullen |
| 2013/0325856 A1 | 12/2013 | Soto |
| 2015/0032866 A1* | 1/2015 | Johnson ............. G06Q 30/0201 709/221 |
| 2015/0066886 A1* | 3/2015 | Wu .................. G06F 17/30864 707/706 |
| 2015/0205595 A1 | 7/2015 | Dudai |

OTHER PUBLICATIONS

"Adding deep linking to Google+ posts shared from your iOS app," [online] [Retrieved on Jan. 7, 2014]; Retrieved from the Internet URL: https://developers.google.com/+/mobile/ios/share/deep-link; 3 pages.

"App Linking," [online] [Retrieved on Jan. 7, 2014]; Retrieved from the Internet URL: https://developers.facebook.com/docs/android/link-to-your-native-app/; 14 pages.

"Class Gecko View Content," [online] [Retrieved on Jan. 2, 2014]; Retrieved from the Internet URL: people.mozilla.org/~mfinkle/geckoview/docs/org/Mozilla/gecko/GeckoViewContent.html; 4 pages.

"Deeplink.me Lets Mobile Users Navigate Through A "Web" of Apps," [online] [Retrieved on Dec. 13, 2013]; Retrieved from the Internet URL: techcrunch.com/2013/05/22/new-service-called-deeplink-me-will-let-mobile-users-navigate-through-a-web-of-apps/; 8 pages.

"Frequently Asked Questions—General Information," [online] [Retrieved on Jan. 7, 2014]; Retrieved from the Internet URL: https://linksmanager.com/Frequently+Asked+Questions+General+Information; 8 pages.

"Google's Search Results Can Deep-Link to Your Android Apps," [online] [Retrieved on Dec. 13, 2013]; Retrieved from the Internet URL: techcrunch.com/2013/10/31/android-4-4-kitkat-app-indexing/; 6 pages.

"How to determine when an application is fully launched?" [online] [Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"How to get a deep link of my application from the Windows Phone Marketplace using .NET code?" [online] [Retrieved on Dec. 13, 2013]; Retrieved from stackoverflow.com/questions/13639564/how-to-get-a-deep-link-of-my-application-from-the-windows-phone-marketplace-usin; 2 pages.

"Indexing apps just like websites," [online] [Retrieved on Dec. 13, 2013]; Retrieved from the Internet URL: googlewebmastercentral.blogspot.com/2013/10/indexing-apps-just-like-websites.html; 4 pages.

"Instant Pages on Google Chrome," [online] [Retrieved on Dec. 16, 2013]; Retrieved from the Internet URL: chrome.blogspot.jp/2011/08/instant-pages-on-google-chrome.html; 3 pages.

"Mobile deep linking," [online] [Retrieved on Dec. 13, 2013]; Retrieved from the Internet URL: en.wikipedia.org/wiki/Mobile_deep_linking; 2 pages.

"NSApplication Class Reference," [online] [Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.

"Ready for a "Web" of Apps? Quixey Launches AppURL, A New Way to Enable Deep Linking Across Mobile Applications," [online] [Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.

"Seven Tips for Supercharging Your Links," [online] [Retrieved on Jan. 7, 2014]; Retrieved from the Internet URL: goarticles.com/article/Seven-Tips-For-Supercharging-Your-Links/3056299/; 5 pages.

"Sharing to Google+ from your Android app," [online] [Retrieved on Jan. 7, 2014]; Retrieved from the Internet URL: https://developers.google.com/+/mobile/android/share/handling_incoming_deep_links; 2 pages.

van Engelen, "Developing Web Services for C and C++," IEEE Internet Computing, pp. 53-61, Apr. 2003.

* cited by examiner

MONITORING APPLICATION LOADING

CROSS-REFERENCE TO RELATED APPLICATIONS

This application is a continuation application of, and claims priority to, U.S. patent application Ser. No. 14/807,772, titled "MONITORING APPLICATION LOADING," filed on Jul. 23, 2015, now U.S. Pat. No. 9,348,671. The disclosure of the foregoing application is incorporated herein by reference in its entirety for all purposes.

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc.

Furthermore, with the advent of tablet computers and smart phones, native applications that facilitate the performance of the same functions facilitated by the use of web page resources are now being provided in large numbers. Additionally, native applications that do not have websites with synchronous content, such as games, are also very popular on tablet computers and smart phones. Accordingly, search systems now also facilitate searching of these native applications.

One process by which search systems gather information for native applications is by accessing "deep links" for the native applications. A deep link is an instruction specifying a particular environment instance of a native application and configured to cause the native application to instantiate the environment instance of the specified native application when selected at a user device. The native application generates the environment instance for display within the native application on a user device.

Once the native application is instantiated, the search system may crawl and index the content provided in the environmental instance. The native application, however, should be fully instantiated before the crawling and indexing operation beings, otherwise some information may not be indexed.

SUMMARY

This specification describes technologies relating to monitoring application loading to determine when an application is sufficiently instantiated to be subject to a crawling operation.

In general, one innovative aspect of the subject matter described in this specification include the actions of instantiating a native application instance that generates environment instances for display on a user device within the native application instance; in response to the instantiation of the native application instance: monitoring for occurrences of activity lifecycle events of the native application instance, monitoring for changes in a memory footprint of the native application instance, and generating, in response to the monitoring of the lifecycle events and monitoring of the changes in the memory footprint indicating the native application instance is sufficiently instantiated to be subject to a crawling operation, a load signal indicating the native application instance is sufficiently instantiated to be subject to the crawling operation. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By monitoring subsets of the requests, activity lifecycle events, and memory footprint the system does not need to rely on a fixed timeout and thus makes better use of resources than other systems that use and require fixed timeouts to initiate a crawling operation. This results in a more efficient utilization of system resources, as time is not wasted for timeouts that are too long, and fewer re-crawls of native applications due to incomplete loads are required. Further, the monitoring of subsets of the requests, activity lifecycle events, and memory footprint decreases the likelihood that the crawling and indexing operation will fail or omit information from the crawling and indexing operations. The method also automatically adjusts to each particular application, and need not be individually tuned or otherwise require application-specific parameters. This provides the additional benefit of not requiring system tuning by administrations, which further reduces system maintenance costs.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
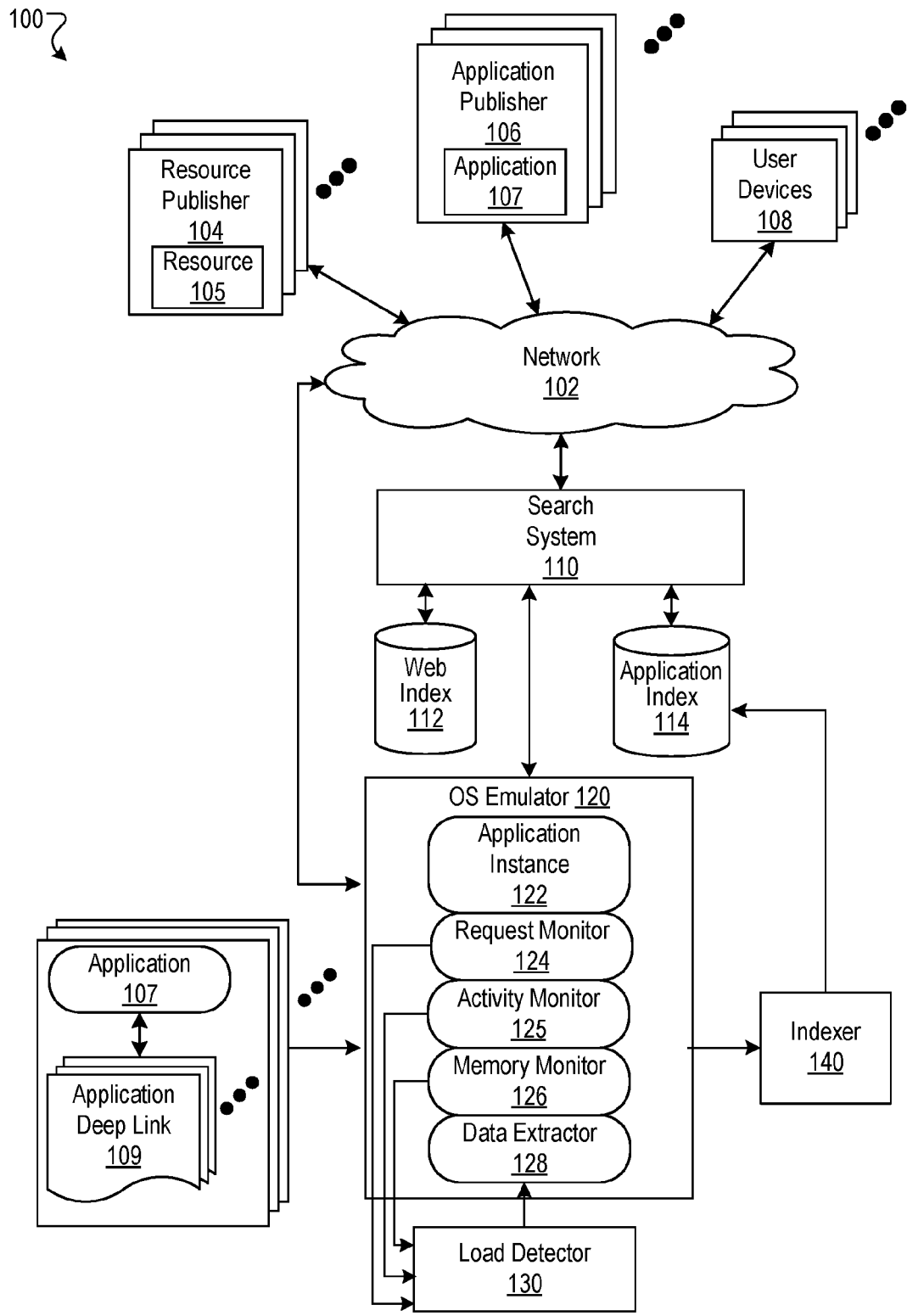
FIG. 1 is a block diagram of an example environment in which native applications are indexed in response to determining the native applications are sufficiently instantiated.

A system receives a set of deep links for a native application and, for each deep link, instantiates the native application in preparation for crawling and indexing content provided by the native application in response to the deep link. As used herein, a native application generates environment instances for display on a user device within an environment of the native application, and operates independent of a browser application on the user device. A native application is an application specifically designed to run on a particular user device operating system and machine firmware. Native applications thus differ from browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific.

A deep link is an instruction specifying a particular environment instance of a native application and configured to cause the native application to instantiate the environment instance of the specified native application when selected at a user device. The native application generates the environment instance for display within the native application on a user device. For example, a deep link may specify a selection menu for a game environment; or content from a website, such as a news site, forum, and the like; or a particular recipe for a cooking application; and the like.

To properly crawl and index native application content, the system must determine when the native application is sufficiently instantiated, e.g., finished loading and displaying the content that should be crawled for the deep link. Applications, however, may go through many states: fetching some content, processing the content, showing intermediate results before displaying final results, etc.

The system and methods in this specification perform an automatic and application-independent way of determining when an application is sufficiently instantiated for a crawling and indexing operation. In an implementation, the system, in response to the instantiation of the native application instance, monitors for occurrences of activity lifecycle events of the native application instance and monitors for changes in a memory footprint of the native application instance. When the monitoring indicates that the native application is sufficiently instantiated to be subject to the crawling operation, the system generates a load signal. The load signal causes a crawling system to crawl and index the content of the native application instance.

In some implementations, the load signal is generated based on monitoring a lack of a new activity lifecycle event and monitoring a steady memory footprint. Monitoring of additional load factors can also be considered, such as whether there are outstanding content requests. In some implementations, each monitored load factor must have a constituent load signal generated before the load signal for the native application is generated. In other implementations, the constituent load signals may serve as votes, and the load signal for the native application is generated when a majority of constituent load signals is generated. In still other implementations, any given constituent load signal may be dependent on another constituent load signal, e.g., a constituent load signal for the memory footprint may not be generated until a constituent load signal for the activity lifecycle events is generated, or vice-versa.

These features and additional features are described in more detail below.

FIG. 1 is a block diagram of an example environment 100 in which native applications are indexed in response to determining the native applications are sufficiently instantiated.

A computer network 102, such as the Internet, connects resource publisher web sites 104, application publishers 106, user devices 108 and a search system 110.

A resource publisher website 104 includes one or more web resources 105 associated with a domain and hosted by one or more servers in one or more locations. Generally, a resource publisher web site is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

An application publisher website 106 may also include one or more web resources 105, and also provides native applications 107. As described above, a native application 107 is an application specifically designed to run on a particular user device operating system and machine firmware. As used in this specification, an "environment instance" is a display environment within a native application and in which is displayed content, such as text, images, and the like. An environment instance is specific to the particular native application, and the native application is specific to the particular operating system of the user device 108. An environment instance differs from a rendered web resource in that the environment instance is generated within and specific to the native application, while a web resource may be rendered in any browser for which the web page resource is compatible, and is independent of the operating system of the user device.

A user device 108 is an electronic device that is under the control of a user. A user device 108 is typically capable of requesting and receiving web page resources 105 and native applications 107 over the network 102. Example user devices 108 include personal computers, mobile communication devices, and tablet computers.

To search web resources 105 and the native applications 107, the search system 110 accesses a web index 112 and an application index 114. The web index 112 is an index of web resources 105 that has, for example, been built from crawling the publisher web sites 104. The application index 114 is an index of environment instances for native applications 107, and is constructed using an indexer 114 that receives data crawled from an application instance 122 of a native application. Although shown as separate indexes, the web index 112 and the application index 114 can be combined in a single index.

The user devices 108 submit search queries to the search system 110. In response to each query, the search system 110 accesses the web index 112 and the application index 114 to respectively identify resources and applications that are relevant to the query. The search system 110 may, for example, identify the resources and applications in the form of web resource search results and native application search results, respectively. Once generated, the search results are provided to the user device 108 from which the query was received.

A web resource search result is data generated by the search system 110 that identifies a web resource and provides information that satisfies a particular search query. A web resource search result for a resource can include a web page title, a snippet of text extracted from the resource, and a resource locator for the resource, e.g., the URL of a web page. A native application search result specifies a native application and is generated in response to a search of the application index 114 of environment instances. A native application search results includes a "deep link" specifying a particular environment instance of the native application and which is configured to cause the native application to instantiate the specified environmental instance. For example, selection of a native application search result may cause the native application to launch (if installed on the user device 108) and generate an environment instance referenced in the application search result in the form of a screen shot.

As described above, publishers 106 that provide native applications 107 also provide deep links to the search system 110. Furthermore, third parties may also provide deep links for native applications. Additionally, the search system 110 can discover deep links from other multiple sources, such as app maps, web page annotations, etc., and thus the set of deep links may be constantly changing. For example, an application publisher may provide a list of deep links 109 in the form of uniform resource identifiers (URIs) (or other instruction types that are specific to the native application published by the publisher). These deep links are deep links that publisher 106 desires to be crawled and indexed in the application index 114.

In some implementations, to crawl and index the native applications 107, the search system 110, or a system associated with the search system 110, uses an operating system emulator 120 that emulates an operating system on which native applications 107 are executed. The operating system emulator 120 instantiates an instance 122 of a native application for each deep link 109. During instantiation, a load detector 130 receives data from a request monitor 124, an activity monitor 125, and a memory monitor 126, and, using the received data, determines whether the native application instance 122 is sufficiently instantiated for a crawling and indexing operation. When the load detector determines the native application instance 122 is sufficiently instantiated for the crawling and indexing operation, the load detector 130 generates a load signal. A data extractor 128 receives the load signal, and in response crawls the content of the native application instance 122. The crawled content is provided to the indexer 140, which then indexes the content of the native application in the application index 114.

While the examples below are described in the context of an emulator 120, other devices and environments can be used for monitoring the status of an application. For example, a virtual machine or even an instrumented mobile device can be used.

Figure 2:
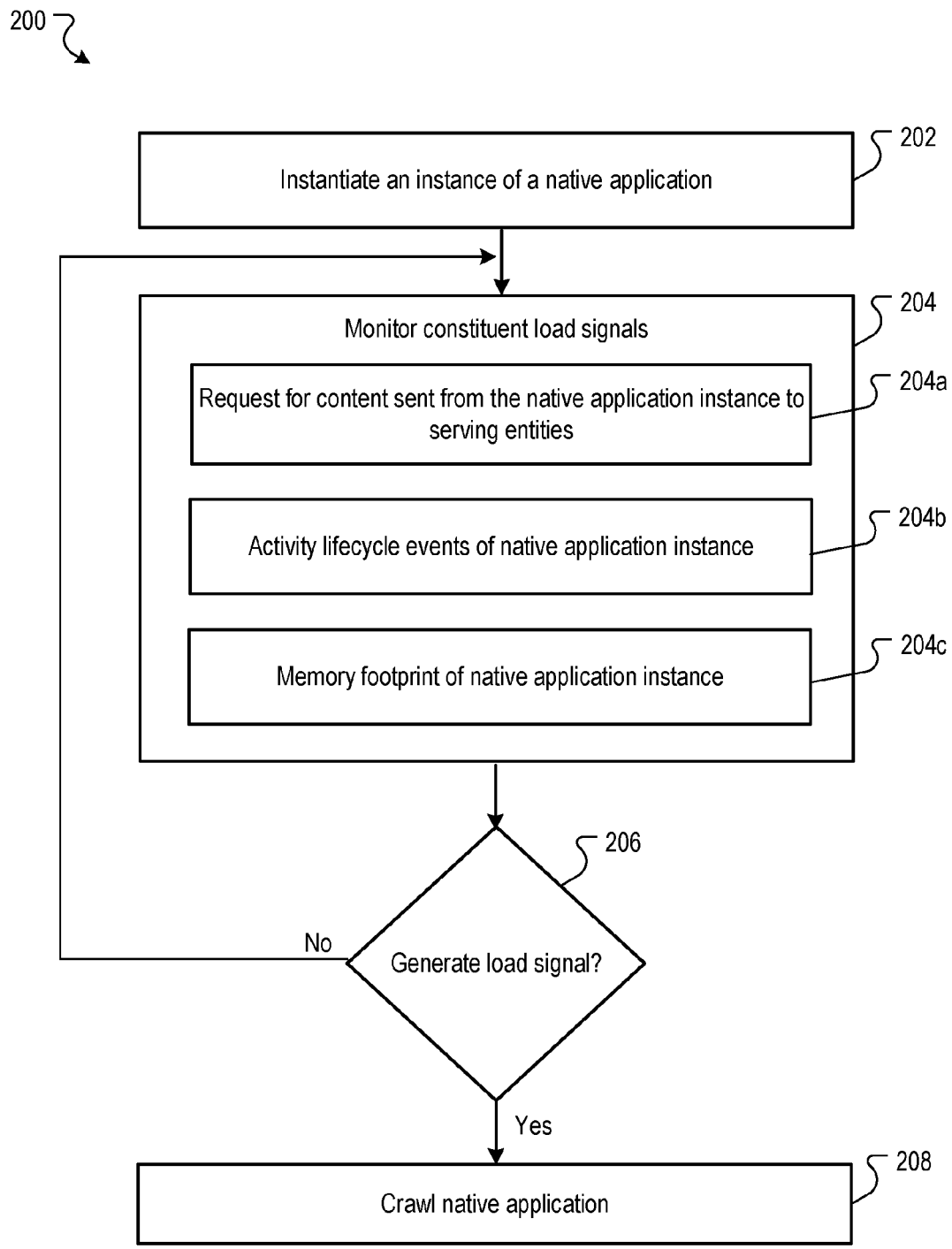
FIG. 2 is a flow diagram of an example process for determining whether an application is sufficiently instantiated.

Generation of the load signal is described in more detail with reference to FIG. 2, which is a flow diagram of an example process 200 for determining whether an application is loaded. The process 200 can be implemented in a data processing apparatus, such as one or more computers in data communication.

The process 200 instantiates an instance of a native application (202). For example, the OS emulator 120 selects a deep link 109 to instantiate a native application. The OS emulator 120 is configured to instrument the instance 122 of the native application so that the request monitor 124, activity monitor 125, and memory monitor 126 can monitor the status of requests, activities, and memory related to the instantiation of the native application, respectively. Each of the request monitor 124, activity monitor 125, and memory monitor 126 may include a process that is loaded in the same application process space or loaded entirely separate from the application instance 122.

The process 200 monitors constituent load signal sources, which in the current implementation may include requests for content sent from the native application instance to serving entities that are external to the native application instance, activity lifecycle of the native application instance, and the memory footprint of the native application instance (204). In the current implementation, the constituent load signals are not required to be monitored in a particular or defined order, and the constituent load signals may be monitored simultaneously. In other implementations, the monitoring of constituent load signals may be dependent on each other, e.g., activity lifecycle events are monitored until a constitute activity lifecycle load signal is generated, and then the memory footprint of the native application is monitored.

In some implementations, the constituent load signal sources are not monitored until a launch timeout has occurred. For example, after instantiation of the instance of the native application, a launch timeout may occur prior to monitoring the crawling operation parameters.

Figure 3:
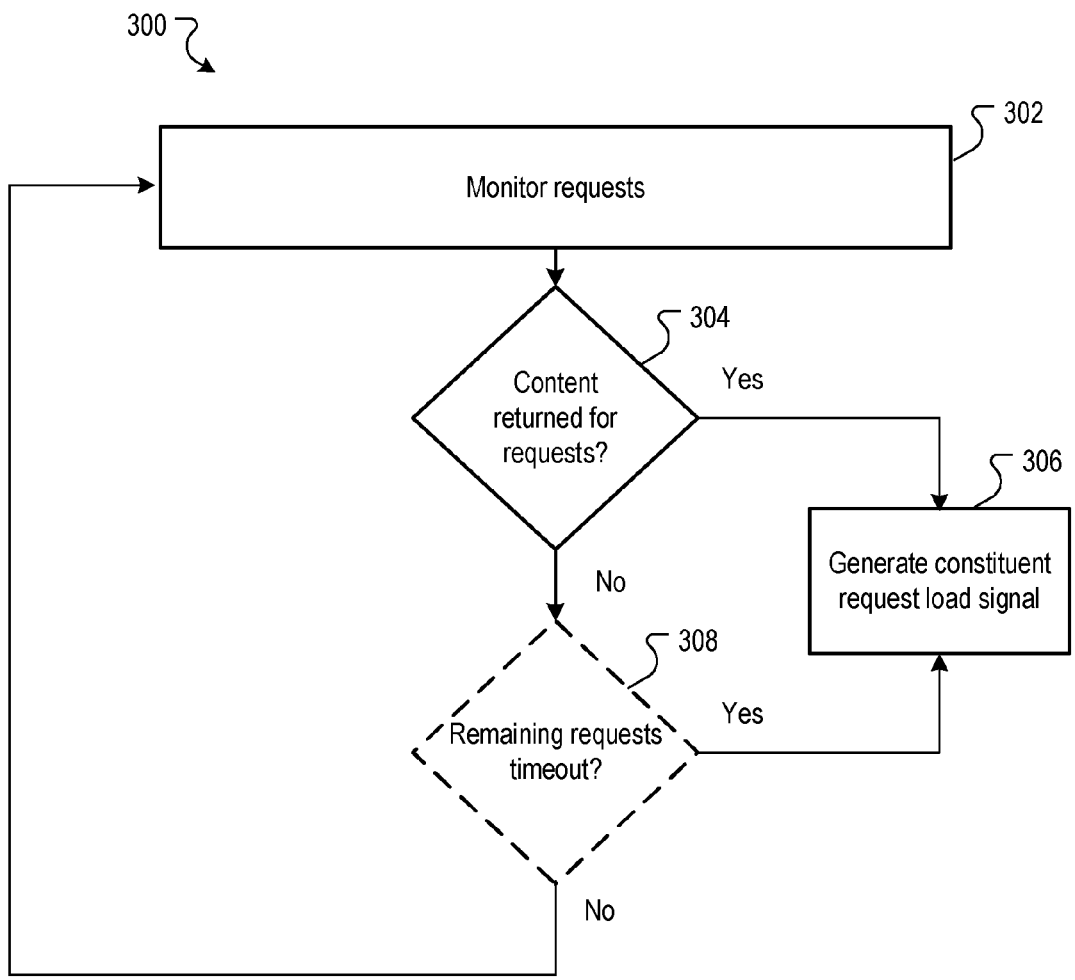
FIG. 3 is a flow diagram of an example process for determining whether requests have been fulfilled.

The request monitor 124 may monitor requests for content sent from the native application instance to serving entities that are external to the native application instance (204a). For example, the request monitor 124 may be configured to act as a proxy that intercepts requests, logs the requests, and then sends the requests to the external services. The time the request was sent is monitored by the request monitor 124 and the content received in response to the request is also monitored. When content is received in response to a request, the request monitor 124 provides the content to the application instance 122. In some implementations, a determination may be made as to whether each monitored request is fulfilled. For each request, the request monitor 124 determines, for example, whether content has been received for the request. If content has been received for a request, the request monitor 124 may determine whether the content is responsive to the request. Additionally, the request monitor 124 may also determine if a request has timed out, e.g., a response has not been received within a predefined timeout period. FIG. 3 below describes in more detail an example process 300 of determining whether a request is fulfilled.

When the request monitor 124 determines, based on the monitoring requests for content, that the native application instance is sufficiently instantiated to be subject to the crawling operation, it generates a request load signal. The request load signal is a constituent indication that the native application is sufficiently loaded to be crawled.

The activity monitor 125 may monitor activity lifecycle events of the native application instance (204b). An activity lifecycle event is an event that describes a transition between different states in an application lifecycle. For example, during a splash screen, an application may be in a first lifecycle event, and then the transition from the splash screen to a main menu may be indicated by a second lifecycle event. The two events that occur in sequence may be the same, or may be different.

The OS emulator 120 implementing the application instance 122 may be instrumented to monitor the lifecycle events and determine an activity lifecycle event state of the native application. For example, states of an activity may be running, paused, background, or stopped, among others. Operations performed by the native application may result in change of an activity lifecycle state. Example activity lifecycle events include OnCreate( ), OnStart( ), OnResume( ), OnPause( ), OnStop( ), OnRestart( ), and OnDestroy( ), among others. The activity lifecycle, in some implementations, may be the collection of methods called by the OS emulator 120 for each activity of the application instance 122, and an activity lifecycle event may occur when a method is called by the OS emulator 120 for an activity of the application instance 122.

Figure 4:
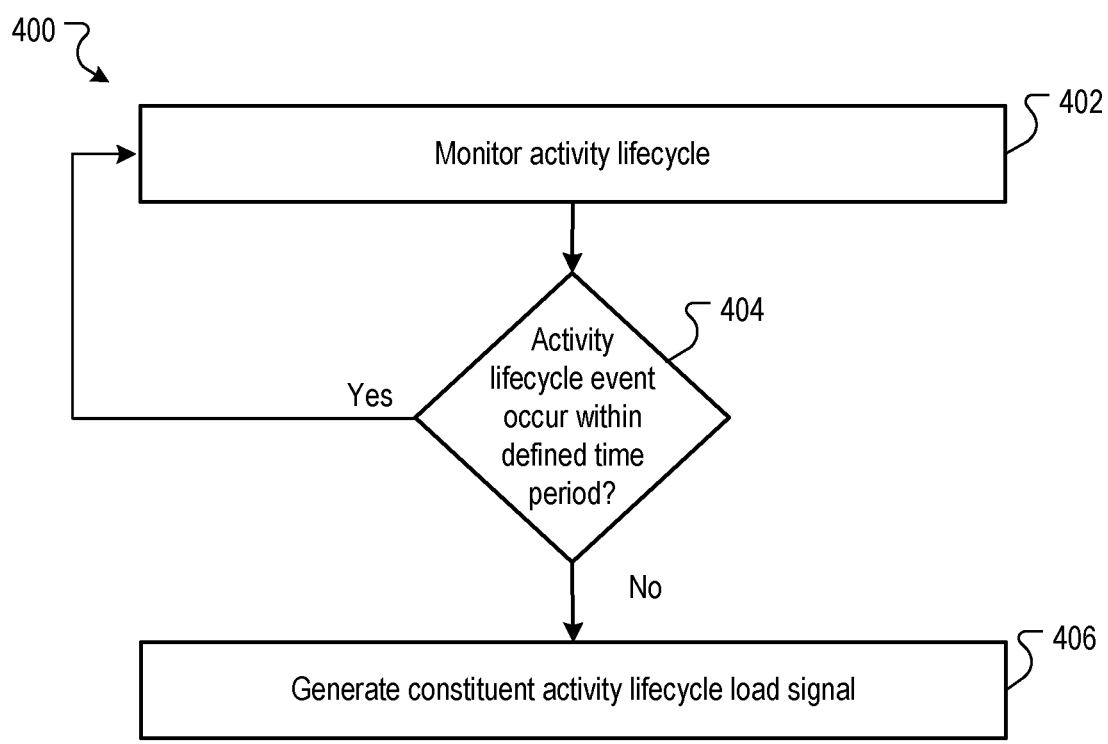
FIG. 4 is a flow diagram of an example process for determining whether an activity lifecycle of the native application indicates sufficient instantiation.

In some implementations, the activity monitor 125 may monitor, e.g., by intercepting, the OS emulator 120 calls to the activities of the application instance 122 in order to determine if an activity lifecycle event has occurred for an activity of the application instance 122. In some implementations, the monitoring of the activity lifecycle may be performed by sandboxing, or otherwise isolating, the application instance 122. FIG. 4 below describes in more detail an example process 400 of determining whether an activity lifecycle of the native application indicates sufficient instantiation.

When the activity monitor 125 determines, based on monitored activity lifecycle events, that the native application instance is sufficiently instantiated to be subject to the crawling operation, it generates an activity lifecycle load signal. The activity lifecycle load signal is a constituent indication that the native application is sufficiently loaded to be crawled.

Figure 5:
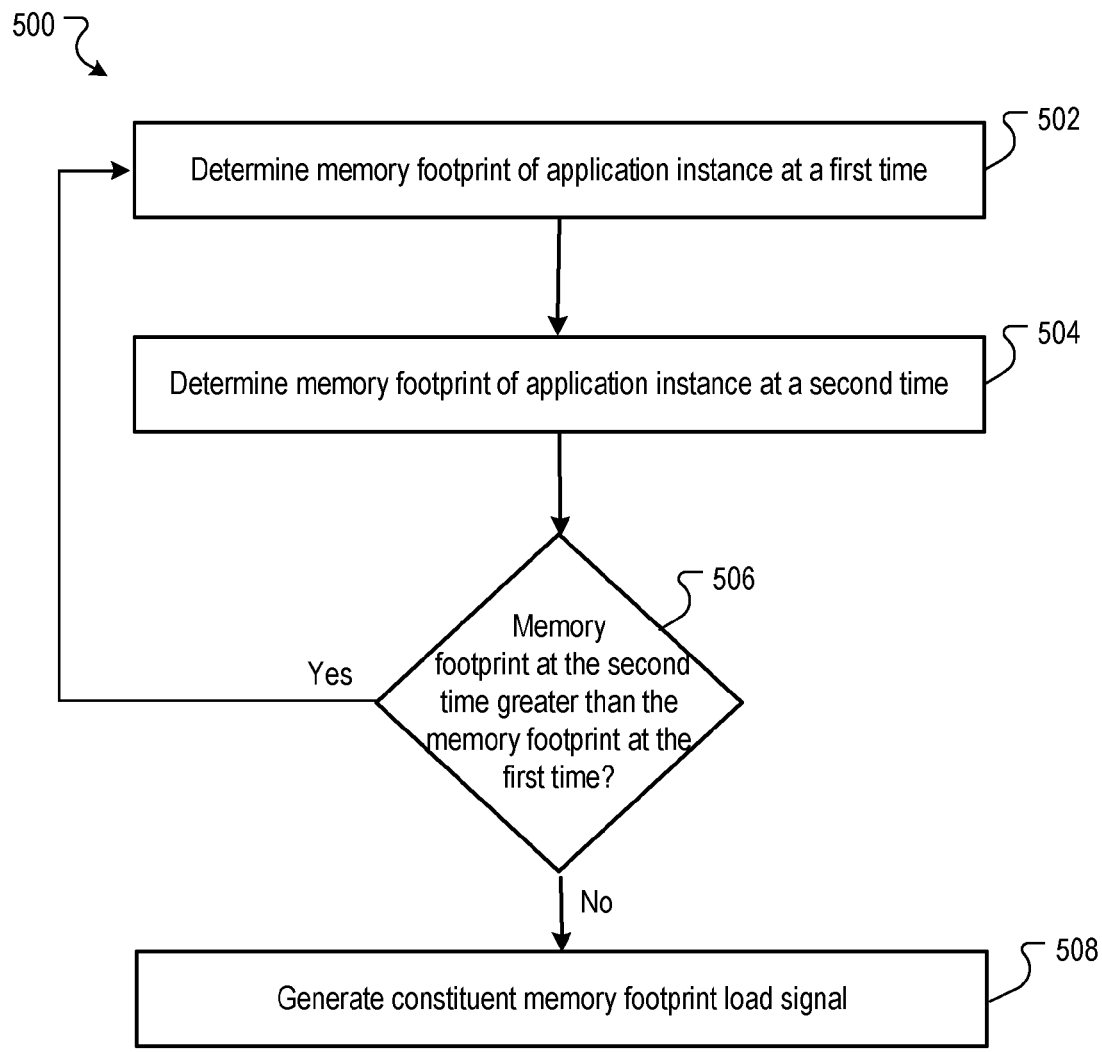
FIG. 5 is a flow diagram of an example process for determining whether a memory footprint of the native application indicates sufficient instantiation.

The memory monitor 126 may monitor the operation parameter of the memory footprint of the native application instance (204c). For example, the memory monitor 126 may monitor the memory footprint or amount of memory the application instance 122 is consuming. During operation of the application instance 122, memory of the OS emulator 120 will be consumed by the application instance 122, and when the application instance 122 is launched, the amount of memory consumed by the application instance 122 will increase. In some implementations, after launching the application instance 122, a steady memory footprint of the application instance 122 may be reached. The memory footprint of the application instance 122 may be determined by the memory monitor 126 continuously or at different points in time, which may be at regular intervals, irregular intervals, or at different transition points of the application. For example, the memory monitor 126 may determine the memory footprint of the application instance 122 when the application instance 122 is launched, and then determine the memory footprint when a new application instance 122 activity is initiated. FIG. 5 below describes in more detail an example process 500 of determining whether a memory footprint of the native application indicates sufficient instantiation.

When the memory monitor 126 determines, based on monitored memory footprint values, that the native application instance is sufficiently instantiated to be subject to the crawling operation, it generates a memory footprint load signal. The memory footprint load signal is a constituent indication that the native application is sufficiently loaded to be crawled.

Based on monitoring the constituent load signal sources and any resulting constituent load signals that are generated, the system determines whether to generate a load signal (206). For example, the load detector 130 may receive the data from the request monitor 124, the activity monitor 125, and the memory monitor 126, and, using the received data, determine if the native application instance 122 is sufficiently instantiated for a crawling and indexing operation.

In some implementations, each monitored load factor must have a constituent load signal generated before the load signal for the native application is generated, e.g., the load signal is logical AND of the constituent load signals. In other implementations, the constituent load signals are tallied as votes by the load detector 130, and the load signal for the native application is generated when a majority of constituent load signals is generated.

In still other implementations, any given constituent load signal may be dependent on another constituent load signal, e.g., a constituent load signal for the memory footprint may not be generated until a constituent load signal for the activity lifecycle events is generated, or vice-versa.

Other appropriate ways of processing the constitute load signals to determine whether to generate the load signal can also be used.

When the load detector determines the native application instance 122 is sufficiently instantiated for the crawling and indexing operation, the load detector 130 generates the load signal (208), and in response the data extractor 128 receives the load signal and crawls the content of the native application instance 122. The indexer 140 then indexes the crawled data. Otherwise, if the process 200 determines, based on monitoring the constituent load signal sources, that the application instance 122 is not sufficiently instantiated to be subject to the crawling process, then the process 200 returns to monitoring the constituent load signal sources (204).

FIG. 3 is a flow diagram of an example process 300 for determining whether requests have been fulfilled. The process 300 monitors requests (302). For example, as described above, the request monitor 124 monitors for content to be returned for requests.

The process 300 determines whether content is returned for the requests (304). If content is returned for each of the requests, then the process may determine that the requests are fulfilled and generates a constituent request load signal (306), depending on the content returned. For example, in some implementations, a request is deemed fulfilled only if the content received is responsive to the request, and does not indicate an incomplete response or an error. An error may be a notification that an address to which the request was sent is unresolvable or a requested resource no longer exits. In some implementations, the failure of the request being fulfilled will preclude crawling and indexing of the native application instance 122. Such a result may be desirable to ensure that the search system 110 provides search results for only deep links for which content is available.

In other implementations, a request is deemed fulfilled even if the content received indicates an incomplete response or an error. This can occur when it is desired to index a native application using "best efforts." Thus, even if all the requested content is not available, at least the content received will be crawled and indexed.

If the process 300 determines content is not returned for all the request, then the process 300 determines if timeouts for the remaining requests have occurred (308). This stage may be optional, and can be implemented when it is desired to index a native application using best efforts as described above. The request timeout can be a time period that is selected so that at the expiration of the time period the request is likely to have been fulfilled but for an error. The time can be selected based on historical observations, or can be a fixed time period, e.g., five seconds. The time period is measured from the time the request handler 124 sent the request.

If the process 300 determines the request timeouts have occurred, then the process 300 determines the request is fulfilled and generates a constituent request load signal (306). Otherwise, the process 300 determines the request is not fulfilled and continues to monitor requests.

FIG. 4 is a flow diagram of an example process 400 for determining whether activity lifecycle events of the native application indicates sufficient instantiation. As previously described, the activity monitor 125 may monitor the activity lifecycle of the native application instance (402). The activity monitor 125 may monitor (e.g., intercept) the OS emulator 120 calls to the activities of the application instance 122 in order to determine if an activity lifecycle event has occurred for an activity of the application instance 122.

The activity monitor 125 determines whether a lifecycle event has occurred within a time period (404). If it is determined there has been a new activity lifecycle event in the period of time, then the activity monitor 125 resets the time period and monitors the activity lifecycle events, returning to step 402. The activity lifecycle timeout may be a same or different time compared to a launch timeout, a timeout request, or any timeout associated with the memory monitor 126. The time period of the activity lifecycle timeout may be a time that is determined to be sufficient for the application instance 122 to instantiate, and may be set by system administrators or learned by a machine learning system.

When there is not an activity lifecycle event within the activity lifecycle timeout (406), the activity monitor 125 generates a constituent activity lifecycle load signal (406). The load detector 130 may then use this information, along with other constituent load signals, to determine if the application instance 122 has sufficient instantiation for the crawling operation.

FIG. 5 is a flow diagram of an example process 500 for determining whether a memory footprint of the native application indicates sufficient instantiation. In the process 500, the memory footprint of the application instance 122 may be determined at a first time (502). The memory monitor 126 may monitor the memory footprint or amount of memory the application instance 122 is consuming. As previously described, during operation of the application instance 122, memory of the OS emulator 120 will be consumed by the application instance 122, and when the application instance 122 is launched, the amount of memory consumed by the application instance 122 will increase. In some implementations, after launching the application instance 122, a steady memory footprint of the application instance 122 may occur after the application is fully loaded. The memory footprint may be the application instance's 122 memory footprint, which may be the amount of main memory of the user device 108 the application instance 122 is using or referencing at a particular time. In some implementations, the application instance's 122 memory footprint may be determined from a heap size associated with the native application.

The first time for determining the memory footprint of the application instance 122 may be at the time the application is launched. However, there can also be a memory footprint timeout after the application instance 122 is launched before the first memory footprint is obtained. The timeout may be a same or different time compared to the timeouts previously described. Alternatively, the first memory footprint may be obtained when the constituent activity lifecycle load signal is generated.

The memory footprint of the application instance 122 is determined at a second time (504). From the first time, the second time may be a regular interval (e.g., 50 milliseconds), an irregular interval (e.g., a range between two seconds and ten seconds), or after some other native application event.

The process 500 determines whether the memory footprint at the second time is greater than the memory footprint at the first time (506). When the application instance 122 is launched, the amount of memory consumed by the application instance 122 will increase, and after launching of the application instance 122 is complete, a steady, unchanging memory footprint of the application instance 122 may be reached. If the memory footprint at the second time is not greater than the memory footprint at the first time (508), then there is an indication, based on the memory footprint determined by the memory monitor 126, that the application instance 122 has reached a point of sufficient instantiation for the crawling operation. The memory monitor then generates the constituent memory footprint load signal (508).

However, if the memory footprint at the second time is greater than the memory footprint at the first time, then process 500 may return to step 502. Alternatively, the process 500, after the first determination that the memory footprint at the second time is greater than the memory footprint at the first time, may instead return to step 504 to compare a current footprint value collected at another iteration of step 504 to a prior footprint value collected at a prior iteration of step 504. As previously described, if the memory footprint is greater at the second time than the first time (or greater at current time than at a prior time), then there is an indication that the application instance 122 has not reached a point of sufficient instantiation for the crawling operation to take place.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus, the method comprising:
    instantiating a native application instance that generates environment instances for display on a user device within the native application instance;
    in response to the instantiation of the native application instance:
        determining a memory footprint of the native application instance, the memory footprint specifying an amount of the data processing apparatus memory the native application instance is using at a particular time that the memory footprint is determined; and
        iteratively monitoring the memory footprint of a native application, the iteratively monitoring comprising, for each iteration:
            determining a subsequent memory footprint of the native application instance at a time subsequent to a time that a prior memory footprint was determined;
            determining whether the amount of the data processing apparatus memory specified by the subsequent memory footprint of the native application instance determined at the time subsequent to the time that the prior memory footprint was determined is greater than the amount of the data processing apparatus memory specified by the prior memory footprint; and
            in response to determining that the subsequent memory footprint of the native application instance determined at the time subsequent to the time that the prior memory footprint was determined is not greater than the prior memory footprint, generating a memory footprint load signal that is a constituent indication that the native application instance is sufficiently instantiated to be subject to a crawling operation.

2. The computer-implemented method of claim 1, further comprising:
    monitoring for an occurrence of a first event of the native application instance in response to the instantiation of the native application instance; and
    iteratively monitoring the memory footprint of a native application comprises iteratively monitoring the memory footprint of a native application only after monitoring the occurrence of the first event.

3. The computer-implemented method of claim 2, wherein the first event is a lifecycle activity event.

4. The computer-implemented method of claim 1, further comprising:
    monitoring for an occurrence of a first event of the native application instance in response to the instantiation of the native application instance; and
    iteratively monitoring the memory footprint of a native application comprises iteratively monitoring the memory footprint of a native application concurrently with the monitoring for the occurrence of the first event.

5. The computer-implemented method of claim 4, wherein the first event is a lifecycle activity event.

6. The method of claim 1, further comprising, in response to the instantiation of the native application instance:
    monitoring requests for content sent from the native application instance to serving entities that are external to the native application instance;
    determining whether each monitored request has been fulfilled; and
    in response to determining that each monitored request has been fulfilled, generating a request load signal that is a constituent indication, based on the monitoring requests for content, that the native application instance is sufficiently instantiated to be subject to the crawling operation.

7. The computer-implemented method of claim 1, wherein monitoring for changes in the memory footprint of the native application instance begins only after an expiration of a launch timeout.

8. A system, comprising:
    a data processing apparatus comprising one or more processors; and
    in non-transitory computer readable storage medium storing instructions executable by the data processing apparatus and that upon such execution cause the data processing apparatus to perform operations comprising:
    instantiating a native application instance that generates environment instances for display on a user device within the native application instance;
    in response to the instantiation of the native application instance:
        determining a memory footprint of the native application instance, the memory footprint specifying an amount of the data processing apparatus memory the native application instance is using at a particular time that the memory footprint is determined; and
        iteratively monitoring the memory footprint of a native application, the iteratively monitoring comprising, for each iteration:
            determining a subsequent memory footprint of the native application instance at a time subsequent to a time that a prior memory footprint was determined;
            determining whether the amount of the data processing apparatus memory specified by the subsequent memory footprint of the native application instance determined at the time subsequent to the time that the prior memory footprint was determined is greater than the amount of the data processing apparatus memory specified by the prior memory footprint; and in response to determining that the subsequent memory footprint of the native application instance determined at the time subsequent to the time that the prior memory footprint was determined is not greater than the prior memory footprint, generating a memory footprint load signal that is a constituent indication that the native application instance is sufficiently instantiated to be subject to a crawling operation.

9. The system of claim 8, the operations further comprising:

monitoring for an occurrence of a first event of the native application instance in response to the instantiation of the native application instance; and iteratively monitoring the memory footprint of a native application comprises iteratively monitoring the memory footprint of a native application only after monitoring the occurrence of the first event.

10. The system of claim 9, wherein the first event is a lifecycle activity event.

11. The system of claim 8, the operations further comprising:

monitoring for an occurrence of a first event of the native application instance in response to the instantiation of the native application instance; and iteratively monitoring the memory footprint of a native application comprises iteratively monitoring the memory footprint of a native application concurrently with the monitoring for the occurrence of the first event.

12. The system of claim 11, wherein the first event is a lifecycle activity event.

13. The system of claim 8, the operations further comprising, in response to the instantiation of the native application instance:

monitoring requests for content sent from the native application instance to serving entities that are external to the native application instance;

determining whether each monitored request has been fulfilled; and in response to determining that each monitored request has been fulfilled, generating a request load signal that is a constituent indication, based on the monitoring requests for content, that the native application instance is sufficiently instantiated to be subject to the crawling operation.

14. The system of claim 8, wherein monitoring for changes in the memory footprint of the native application instance begins only after an expiration of a launch timeout.

15. A non-transitory computer readable storage medium storing instructions executable by the data processing apparatus and that upon such execution cause the data processing apparatus to perform operations comprising:

instantiating a native application instance that generates environment instances for display on a user device within the native application instance;

in response to the instantiation of the native application instance:

determining a memory footprint of the native application instance, the memory footprint specifying an amount of the data processing apparatus memory the native application instance is using at a particular time that the memory footprint is determined; and iteratively monitoring the memory footprint of a native application, the iteratively monitoring comprising, for each iteration:

determining a subsequent memory footprint of the native application instance at a time subsequent to a time that a prior memory footprint was determined;

determining whether the amount of the data processing apparatus memory specified by the subsequent memory footprint of the native application instance determined at the time subsequent to the time that the prior memory footprint was determined is greater than the amount of the data processing apparatus memory specified by the prior memory footprint; and in response to determining that the subsequent memory footprint of the native application instance determined at the time subsequent to the time that the prior memory footprint was determined is not greater than the prior memory footprint, generating a memory footprint load signal that is a constituent indication that the native application instance is sufficiently instantiated to be subject to a crawling operation.

16. The non-transitory computer readable storage medium of claim 15, the operations further comprising:

monitoring for an occurrence of a first event of the native application instance in response to the instantiation of the native application instance; and iteratively monitoring the memory footprint of a native application comprises iteratively monitoring the memory footprint of a native application only after monitoring the occurrence of the first event.

17. The non-transitory computer readable storage medium of claim 16, wherein the first event is a lifecycle activity event.

18. The non-transitory computer readable storage medium of claim 15, the operations further comprising:

monitoring for an occurrence of a first event of the native application instance in response to the instantiation of the native application instance; and iteratively monitoring the memory footprint of a native application comprises iteratively monitoring the memory footprint of a native application concurrently with the monitoring for the occurrence of the first event.

19. The non-transitory computer readable storage medium of claim 15, the operations further comprising, in response to the instantiation of the native application instance:

monitoring requests for content sent from the native application instance to serving entities that are external to the native application instance;

determining whether each monitored request has been fulfilled; and in response to determining that each monitored request has been fulfilled, generating a request load signal that is a constituent indication, based on the monitoring requests for content, that the native application instance is sufficiently instantiated to be subject to the crawling operation.

20. The non-transitory computer readable storage medium of claim 15, wherein monitoring for changes in the memory footprint of the native application instance begins only after an expiration of a launch timeout.

* * * * *